July 16, 1968     P. HAUGEN, JR     3,392,477

FISHING FLY HOLDER AND METHOD

Filed June 10, 1966

*INVENTOR.*
PETER HAUGEN, JR.

*Browne, Schuyler & Beveridge*

ATTORNEYS

United States Patent Office 3,392,477
Patented July 16, 1968

3,392,477
FISHING FLY HOLDER AND METHOD
Peter Haugen, Jr., 720 NE. A St.,
Grants Pass, Oreg. 97526
Filed June 10, 1966, Ser. No. 556,693
11 Claims. (Cl. 43—57.5)

ABSTRACT OF THE DISCLOSURE

A device for storing and selecting fishing flys including a casing enclosing a flexible tape which is biased to a coiled position in the casing with the fishing flys attached to the tape and engaged between successive coiled layers of the tape. To select a fishing fly for use, the tape is uncoiled into extended position out of the casing thus exposing the fishing flys. Upon release of the tape, it returns into coiled position in the casing for storing the flys.

---

This invention relates to a method and device for storing and selecting fishing flies or the like.

One of the objects of the present invention is to provide a novel device and method for safely storing finshing flies against damage or loss while at the same time permitting quick and convenient access for purposes of use or replacement.

A further object of the present invention is the provision of such a device and method which will accommodate a relatively large number of fishing flies in an orderly arrangement allowing simultaneous presentation of all or at least a substantial plurality of the flies to facilitate selection.

A further object is the provision of such a device which is also lightweight, compact, and relatively economical to manufacture and, moreover, is particularly suitable to many needs of the fishermen with respect to storage, use, and selection of fishing flies.

Other objects and advantages of the present invention will become apparent from the following detailed description in connection with the accompanying drawings in which.

Figure 1:
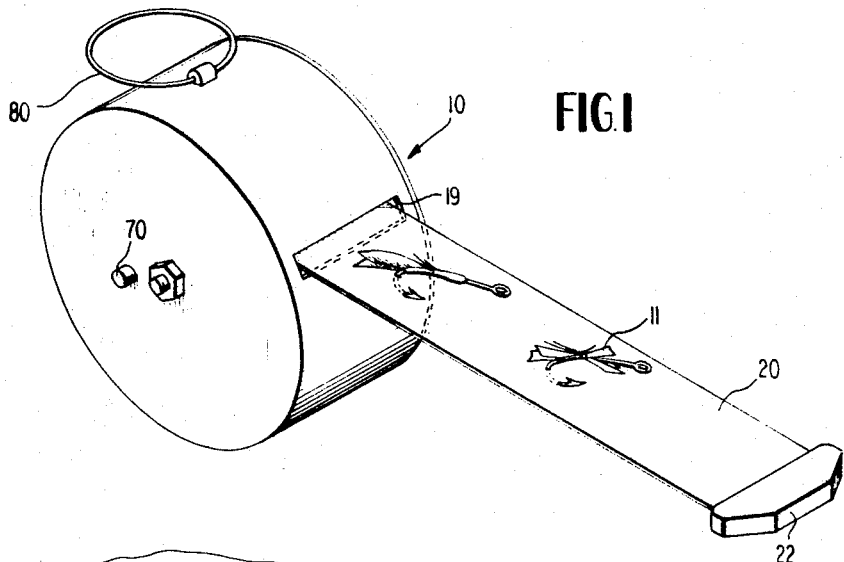
FIG. 1 is a perspective view of a device embodying the present invention including a tape on which the fishing flies are stored, the tape being shown in partly extended position.
Figure 3:
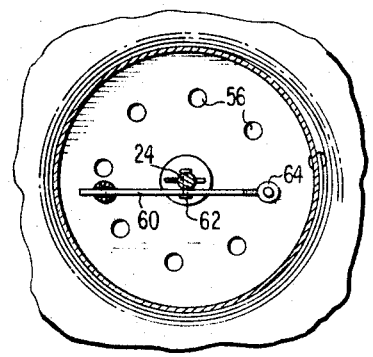
FIG. 3 is a fragmental, cross-section view taken generally along lines 3—3 of FIG. 2.

Referring now to the drawings in detail, there is shown for illustrative purposes only, a device generally designated 10 for storing fishing flies or the like 11. The shown embodiment includes a casing comprised of a cuplike member having a circular base 12 forming one sidewall of the casing, a cylindrical wall 14 integrally projecting therefrom, and a circular plate 16 attached to cylindrical wall 14 by screws 17 to define a chamber 18. Fishing flies 11 are stored on a flexible, elongated tape 20 which is adapted to move between a coiled position in chamber 18 and an extended position projected through an outlet opening 19 in the casing as shown in FIG. 1. Any suitable material may be employed in making tape 20, but preferably a plastic covering is applied about the tape. In attaching the fishing flies, their hooks may be passed through the tape such as shown in FIG. 1. To facilitate extension of tape 20 and use of the device, a tab 22 is fixed to the free end of the tape.

Figure 2:
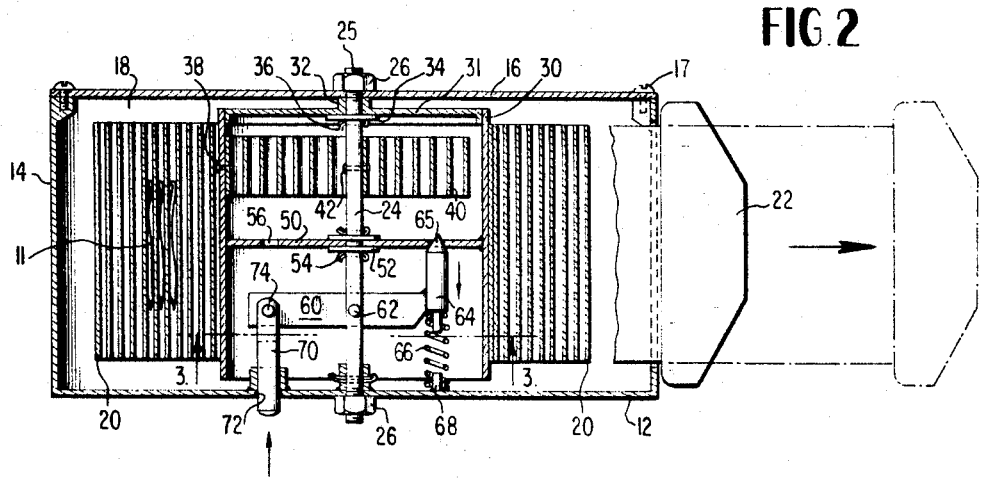
FIG. 2 is an enlarged cross-sectional view of the device shown in FIG. 1 with the tape in completely retracted position but with phantom lines indicating a partially extended position.

Tape 20 is adapted to be coiled about a drum 30 mounted for rotatable movement in the casing on a shaft 24. In the shown embodiment, the inner end of tape 20 is fixed such as by a rivet 38 to the cylindrical portion of drum 30 as shown in FIG. 2. Drum 30 has a generally cuplike shape including an open end and an opposite closed end provided by a plate 31 in which there is formed a hub 32 receiving shaft 24. To position drum 30 against movement along shaft 24 in the shown embodiment, a washer 34, backed by a cotter pin 36, is provided on shaft 24 to engage the inside of plate 31. Additionally in the shown embodiment, shaft 24 is fixed between opposite sidewalls 12 and 16 of the casing by nuts 26 threaded on end portions 25 of shaft 24.

Drum 30 and consequently tape 20 are biased in one rotative direction by a coil spring 40 received in the drum about shaft 24 and having one end fixed such as by rivet 42 to the shaft and having an opposite, movable end fixed to the drum by rivet 38 which also secures tape 20 to the drum. Spring 40 in unstressed condition assumes a coiled position and it will thus be seen that upon extension of tape 20 in the direction of the arrows shown in FIG. 2, spring 40 will be energized such that upon release of tape 20 spring 40 will return to coiled position causing tape 20 to coil or wind about drum 30.

In order to hold tape 20 against movement in any of its positions, a latch mechanism is provided which, in the shown embodiment, includes a disk or plate 50 received within and fixed about its periphery to drum 30. Plate 50 has a central aperture receiving shaft 24, and if desired, a pair of washers 52 and associated cotter pins may be provided on shaft 24 on opposite sides of plate 50. The latch mechanism further includes a lever 60 pivotally connected intermediate its ends to shaft 24 by a pin 62. On one end of lever 60 a pin 74 pivotally connects a plunger 70 which extends through an opening 72 in casing sidewall 12 so as to be manually operable externally of the casing.

On the opposite end of lever 60 is fixed a latch pin 64 having a tapered extremity 65 which is receivable in apertures 56 of plate 50 to prevent rotation of drum 30 and movement of tape 20. Latch pin 64 is biased towards plate 50 by a compression coil spring 66 received over and abutting one end of latch pin 64 with the other end of spring 66 located about a stud 68 projecting from casing sidewall 12. To release the latch to permit movement of drum 30 and tape 20, plunger 70 is depressed, which pivots lever 60 (clockwise as shown in FIG. 2) and withdraws latch pin 64 from apertures 56 in plate 50. When plunger 70 is released, latch biasing spring 66 will force latch pin 64 towards plate 50 to reengage in one of the apertures 56.

In using the device, a number of fishing flies 11 are attached in longitudinally spaced relationship along tape 20 so that when the tape is coiled about drum 30 in the casing the flies will be retained between successive coils or turns of the tape, as shown in FIG. 2. When it is desired to use or remove a fishing fly, the operator depresses latch plunger 70 to release latch pin 64 and then extends tape 20 to expose all or a large majority of the flies at the same time, after which latch plunger 70 is released to hold the tape in extended position. The fisherman may then quickly glance at the flies and make the desired selection. Having made the selection, he depresses latch plunger 70 to release latch pin 64 and permit tape 20 to return to coiled position under the influence of spring 40.

In the preferred embodiment, a ring 80 is attached to the casing to permit securement to the fisherman's belt, thus freeing one of his hands for use in removing the fishing fly when tape 20 is extended.

It will thus be seen that the device of the present invention may be conveniently carried on the person of the fisherman and yet highly facilitates the storage and selection of a relatively large number of fishing flies. Additionally, the device of the present invention may be economically manufactured from standard parts for retail at competitive prices.

Modifications and adaptations of the present invention readily apparent from the foregoing description and associated drawings, although not specifically mentioned herein, will nevertheless be included within the scope of the present invention as indicated in the appended claims.

What is claimed is:

1. A device for storing and selecting fishing flies and the like comprising, a casing having a chamber and an outlet opening communicating with the chamber dimensioned to receive fishing flies and the like, a shaft extending across said chamber and fixed in opposite sidewalls of the casing, a drum rotatable on said shaft, spring means for rotating the drum upon energization of the spring means, a flexible tape adapted to detachably receive said fishing flies attached to one of said drum and spring means and movable between an extended position extending through said outlet opening and a coiled position in the chamber under the biasing force of said spring means, latch means for holding the tape against movement including a plate fixed to said drum for rotation therewith and having a number of angularly spaced perforations, a lever pivotally connected intermediate its ends to said shaft, a manually operable plunger attached to one end portion of said lever and extending externally of the casing for pivoting said lever, a latch pin attached to the opposite end portion of said lever and receivable in said perforations in said plate to prevent movement of said drum to hold said tape in position, and spring means biasing said latch pin into said perforation.

2. The device defined in claim 1 wherein said spring means is a compression coil spring aligned with said latch pin and having one end engaging said latch pin and the other end engaging said casing.

3. The device defined in claim 1 further including a ringlike member fixed to said casing and dimensioned to be attached to the belt or the like of a fisherman.

4. A method of storing and selecting fishing flies or the like including the steps of attaching a number of fishing flies to longitudinally spaced locations on an elongated extended tape which is biased to assume a helically coiled position in an associated casing structure, releasing the tape and allowing it to move into the coiled position in the casing with the fishing flies engaged between successive coiled layers of the tape for storage and subsequently uncoiling the tape out of the casing into an extended position to simultaneously expose a plurality of the fishing flies for selection and removal.

5. The method defined in claim 4 wherein the fishing flies have hooks and are attached to the tape by piercing the tape with the hooks of the fishing flies.

6. A device for storing fishing flies and the like comprising, in combination, a casing having a chamber and an outlet opening communicating with the chamber and of sufficient dimension to permit fishing flies and the like to be passed therethrough, a flexible elongated tape like member having a number of fishing flies attached thereto at longitudinally spaced positions along the tape like member, and means mounting the tape like member for movement between a helically coiled position in the chamber for storing fishing flies between successive coiled layers of the tape like member and an extended uncoiled position through the outlet opening externally of the casing for applying or removing fishing flies.

7. The device defined in claim 6 wherein said fishing flies have hooks which are pierced through the tape like member to attach the fishing flies thereto.

8. The device defined in claim 6 wherein said means include a spring in the chamber biasing the tapelike member into coiled position in the chamber.

9. The device defined in claim 6 further including a releasable latch means for holding the tape against movement.

10. A device for storing fishing flies and the like comprising, in combination, a casing having a chamber and an outlet opening communicating with the chamber and being of sufficient dimension to permit the passage therethrough of fishing flies and the like, a flexible elongated tapelike member having a number of fishing flies attached thereto at longitudinally spaced positions along the tapelike member, and means mounting the tape-like member for movement between a coiled position in the chamber for storing fishing flies and an extended uncoiled position through the outlet opening externally of the casing for applying or removing fishing flies, said means including a spring in the chamber biasing the tape like member into coiled position in the chamber, a rotatable drum in the chamber, said spring having one end attached to the drum to rotate the drum upon energization of the spring, and said tape-like member being attached to the drum to be rotated thereby.

11. The device defined in claim 10 wherein said spring is located within the drum and said tapelike member is coilable about the exterior of the drum.

References Cited

UNITED STATES PATENTS

| | | | |
|---|---|---|---|
| 726,509 | 4/1903 | Connor | 43—57.5 |
| 1,880,705 | 10/1932 | Bitner | 242—107.3 |
| 3,115,723 | 12/1963 | Kline | 43—57.5 |
| 3,286,390 | 11/1966 | Guice | 43—57.5 |

HUGH R. CHAMBLEE, *Primary Examiner.*